United States Patent
Sherwood et al.

(10) Patent No.: US 11,136,270 B2
(45) Date of Patent: Oct. 5, 2021

(54) COMPOSITE TILE AND METHOD OF MANUFACTURE

(71) Applicant: Dynamic Material Systems LLC, Oviedo, FL (US)

(72) Inventors: Walter Sherwood, Ballston Lake, NY (US); Arnold Hill, Orlando, FL (US); Gordon Nameni, Menomonee Falls, WI (US); William Easter, Chuluota, FL (US)

(73) Assignee: Dynamic Material Systems LLC, Oviedo, FL (US)

( * ) Notice: Subject to any disclaimer, the term of this patent is extended or adjusted under 35 U.S.C. 154(b) by 0 days.

(21) Appl. No.: 16/980,544

(22) PCT Filed: Mar. 19, 2019

(86) PCT No.: PCT/US2019/023004
§ 371 (c)(1),
(2) Date: Sep. 14, 2020

(87) PCT Pub. No.: WO2019/183118
PCT Pub. Date: Sep. 26, 2019

(65) Prior Publication Data
US 2021/0002178 A1 Jan. 7, 2021

Related U.S. Application Data

(60) Provisional application No. 62/644,923, filed on Mar. 19, 2018.

(51) Int. Cl.
*C04B 35/532* (2006.01)
*C04B 35/628* (2006.01)
*C04B 35/638* (2006.01)
*C04B 35/64* (2006.01)
*C04B 41/00* (2006.01)
(Continued)

(52) U.S. Cl.
CPC ...... *C04B 35/532* (2013.01); *C04B 35/62802* (2013.01); *C04B 35/638* (2013.01);
(Continued)

(58) Field of Classification Search
CPC ..... C04B 35/532; C04B 35/638; C04B 35/64; C04B 35/62802; C04B 41/5022;
(Continued)

(56) References Cited

U.S. PATENT DOCUMENTS 2,638,456 A 5/1953 Laning
3,915,906 A 10/1975 Romey
(Continued)

FOREIGN PATENT DOCUMENTS

GB 688126 A 2/1953

OTHER PUBLICATIONS

Enrico Bernardo, Advanced Ceramics from Preceramic Polymers Modified at the Nano-Scale: A Review, Materials 2014, 7, 1927-1956.
(Continued)

*Primary Examiner* — Noah S Wiese
(74) *Attorney, Agent, or Firm* — Christopher Paradies; Paradies Law P.A.

(57) ABSTRACT

A composite tile is comprised of coal dust and a pre-ceramic polymer that are mixed together and pyrolyzed to form a ceramic composite. For example, a chemical reaction during pyrolysis chemically converts at least a portion of the coal dust and pre-ceramic polymer to a fire proof ceramic composite suitable for use as a roofing tile either as pyrolyzed or as post-treated to seal cracks and pores formed during pyrolysis.

19 Claims, 1 Drawing Sheet

(51) Int. Cl.
 C04B 41/50 (2006.01)
 C04B 41/86 (2006.01)
(52) U.S. Cl.
 CPC ............ C04B 35/64 (2013.01); C04B 41/009 (2013.01); C04B 41/5022 (2013.01); C04B 41/86 (2013.01); C04B 2235/422 (2013.01); C04B 2235/48 (2013.01); C04B 2235/6021 (2013.01); C04B 2235/656 (2013.01)
(58) Field of Classification Search
 CPC ... C04B 41/86; C04B 41/009; C04B 2235/48; C04B 2235/6021; C04B 2235/656; C04B 2235/422
 See application file for complete search history.

(56) References Cited

U.S. PATENT DOCUMENTS

| | | | |
|---|---|---|---|
| 6,833,011 B2* | 12/2004 | Rogers | B01D 39/2055 156/78 |
| 2012/0003136 A1* | 1/2012 | Skala | C01B 21/0722 423/290 |
| 2016/0009741 A1 | 1/2016 | Singh et al. | |
| 2019/0152864 A1* | 5/2019 | Hill | C04B 35/62834 |
| 2019/0292441 A1* | 9/2019 | Hill | C04B 38/009 |
| 2019/0345071 A1* | 11/2019 | Hill | C04B 35/62245 |

OTHER PUBLICATIONS

O. Charon et al., Variation in Coal Composition: a Computational Approach to Study the Mineral Composition of Individual Coal Particles, Massachusetts Institute of Technology.

Cara L et al., ESCA and FTIR Studies of Bituminous Coal, University of Buffalo, SUNY, Buffalo, NY 14214.

Wang et al., A ceramic-carbon hybrid as a high-temperature structural monolith and reinforcing filler and binder for carbon/carbon composites. Carbon, vol. 59, Mar. 13, 2013, pp. 76-92.

* cited by examiner

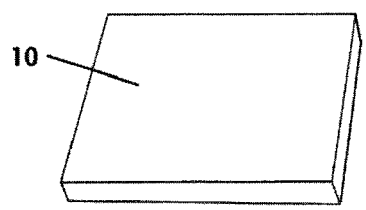
FIG. 1
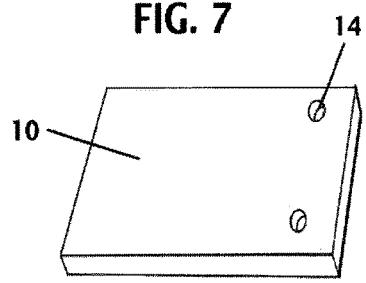
FIG. 7
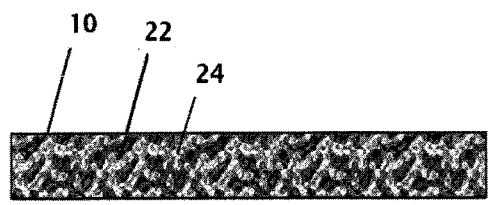
FIG. 2
FIG. 3
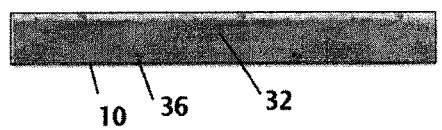
FIG. 4
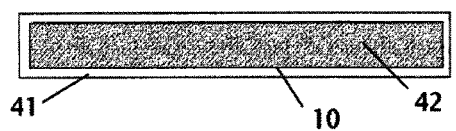
FIG. 5
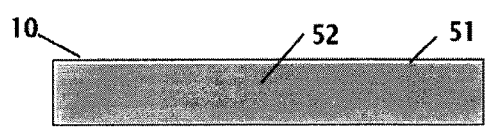
FIG. 6

COMPOSITE TILE AND METHOD OF MANUFACTURE

CROSS RELATED APPLICATIONS

This application is a 371 U.S. national phase application which claims priority to PCT/US2019/023004 filed Mar. 19, 2019 which claims priority to U.S. provisional 62/644,923, which was filed Mar. 19, 2018, and are hereby incorporated by reference herein in its entirety.

FIELD OF THE INVENTION

The field relates to roofing materials and methods of manufacturing roofing tiles.

BACKGROUND

Slate shingles use a natural material, slate, to protect a roof. Slate is fire resistant and durable. However, slate suffers from being comparatively heavier and higher cost than other roofing solutions. Synthetic slate may be produced that simulates natural slate; however, the cost remains comparatively higher than other known roofing materials.

Asphalt shingles are a common way for roofs to be protected on homes, primarily due to the low installed cost. However, the life of asphalt shingles is comparatively short, and asphalt shingles are not very fire resistant. Ceramic tiles are an attractive alternative for roofing; however, ceramic tiles are more easily damaged due to brittleness, are comparatively heavy and are expensive to install. A composite ceramic tile is known that reduces the weight and improves damage resistance compared to ordinary ceramic tiles with a trade-off for cost.

Metal roofing materials are another popular choice for roofing, because metal materials are durable and becomes fire proof with a proper fire resistant underlayment. However, metal may be damaged by hail and is more expensive than asphalt shingles.

None of these solutions utilize coal dust as a constituent of the roofing material. Experts in the field did not think that coal dust or small coal particles could be used to make composite particles and composite articles. The impurities in every source of coal, which is a fossil fuel dug from the ground, is legendary. Every source of coal is comprised of carbonaceous material and many impurities, often hundreds of organic and inorganic substances are found in coal, when it is analyzed.

O. Charon et al., "Variation in Coal Composition: a Computational Approach to Study the Mineral Composition of Individual Coal Particles," shows an example of a composition of one source of coal, Upper Freeport raw coal, and tries to use a computational model to predict the fly ash evolution during pulverized coal combustion, which depends on the amount, composition and spatial distribution of the inorganic matter within individual particles, using computer controlled scanning electron microscopy (CCSEM) to measure mineral distributions in particles as input to the computation model. The model only accounts for five mineral species: quartz, kaolinite, illite, mixed silicates, and pyrite. Even though other minerals exist, these are considered the main constituents affecting fly ash evolution (and were the ones available from CCSEM analysis). Other ways of analyzing coal is by Electron Spectroscopy for Chemical Analysis (ESCA) and Fourier Transform Infrared Spectroscopy (FTIR). Cara L., et al., "ESCA and FTIR Studies of Bituminous Coal," discloses a study of surface chemistry of coal powder showing elements carbon, oxygen, nitrogen, sulfur under various storage conditions. Sulfur was found on the surface of some but not all of the samples. Other elements were detected including: aluminum, silicon, sodium, iron and potassium, but the iron and potassium elements were found only on the surface of one of the raw samples. The sulfur was reportedly found in inorganic and organic species.

While a great deal of research has been done to determine compositions of a few types of coal, these types of coal have been analyzed for the effects of composition on use of the coal as a fuel and not as a structural material.

Materials 2014, 7, 1927-1956, "Advanced Ceramics from Preceramic Polymers Modified at the Nano-Scale: A Review," Enrico Bernardo 1, Laura Fiocco, Giulio Parcianello, Enrico Storti and Paolo Colombo discloses, 6 Mar. 2014, discloses that preceramic polymers " . . . have been successfully used for almost 40 years to give advanced ceramics, especially belonging to the ternary SiCO and SiCN systems or to the quaternary SiBCN system. One of their main advantages is the possibility of combining the shaping and synthesis of ceramics: components can be shaped at the precursor stage by conventional plastic-forming techniques, such as spinning, blowing, injection molding, warm pressing and resin transfer molding, and then converted into ceramics by treatments typically above 800° C. The extension of the approach to a wider range of ceramic compositions and applications, both structural and thermostructural (refractory components, thermal barrier coatings) or functional (bioactive ceramics, luminescent materials), mainly relies on modifications of the polymers at the nanoscale, i.e., on the introduction of nano-sized fillers and/or chemical additives, leading to nano-structured ceramic components upon thermal conversion." Modern pre-ceramic polymer ceramics or polymer-derived ceramics are trying to reduce cracking and other problems with decomposition gases by introducing fillers, either reactive fillers or non-reactive fillers. Some reactive fillers are metals, metal-oxides and the like. Finally, we must mention that also nano-sized fillers can be inert or passive. Carbon nanotubes, carbon nanofibers, graphene, and graphene oxide have been added to pre-ceramic polymers and acted as non-reactive fillers, according to this review. This is consistent with experimental results for other forms of synthetic carbon and pre-pyrolyzed coal dust that has been converted to carbon dust. As for non-reactive carbon fillers, the direction of experimentation is for comparatively low percentages of fillers. For example, " . . . an amount of 1-2 wt % multi-walled carbon nanotubes produced a remarkable increase in fracture toughness . . . " but " . . . the success of this reinforcement technique is essentially linked to the nature of the nanotubes: amorphous MWCNTs were found to degrade upon thermolysis, and so, they were not effective in the toughening mechanism." "Moreover, in their study, they revealed that the addition of MWCNTs up to 2 wt % does not influence the basic material properties of the matrix, such as the Young modulus, the Poisson's ratio, the coefficient of thermal expansion and the bulk density . . . ," which is preferred. The state of the art is directed toward reactive oxide fillers, such as metal oxides, and inert fillers.

Experts in the field of composites believed that coal dust would not provide consistent results comparable to modern composite materials, which are engineered using sources of consistent fillers and compatible polymers and resins. U.S. Pat. No. 2,638,456 was filed in 1949 and issued on May 12, 1953, and it successfully incorporated anthracite particles, the purest form of coal, as a filler in a rubber matrix for plastic cases. However, it used a standard process, at the time, for mixing anthracite and a synthetic rubber, replacing other forms of synthetic carbon with the anthracite. Similarly, U.S. Pat. No. 3,915,906 issued in the 1970's and used coal powder mixed with a polymer, and optionally reinforcing fibers, to make gaskets. Again, the polymer was conventionally mixed with the powder and formed as a sheet or the like with some type of rubber. In both cases, rubber is not subsequently pyrolyzed to form a ceramic or a ceramic composite. Also, people skilled in the art of making composites pre-pyrolyze coal powder, turning the coal powder substantially into carbon, without any organic compounds, water or hydrocarbons remaining in the coal powder, before using the resulting pyrolyzed carbon as an additive. For example, German patent specification 688,126 discloses "Improvements in Shaped Carbon Ceramic Bodies and in their Preparation." The disclosure relates to "artificial carbon" ceramics and mentions the use of the artificial carbon for ornamentally decorated pieces and the like.

Herein, "coal dust" means raw coal that is processed at temperatures less than 400 degrees centigrade and not prepyrolyzed coal dust that is transformed into a carbon additive. (The term "carbon dust" may also refer to any source of carbon that is processed synthetically or artificially to achieve substantially the same chemistry as coal dust, although it is believed, without being limiting in any way, that such as process would be prohibitively expensive and no source of such synthetic "coal dust" exists at this time.)

Coal dust may be formed by coal mining operations and by deliberately crushing coal and/or milling the coal dust into finer and finer particles. The particle size of coal dust is typically in a range from 1 to 100 microns, although any size of coal particle may be formed by crushing, milling and sorting of coal dust.

Coal dust processed at no greater than 400 degrees C., more preferably no greater than 200 degrees C., retains many of the less volatile organics and hydrocarbons. Coal dust that is substantially pyrolyzed (usually requiring temperatures greater than 400 degrees C.) such that substantially all of the organics and hydrocarbons are driven off or oxidized, reduced or otherwise chemically altered such that substantially all of the carbonaceous coal dust is converted to carbon (regardless of trace impurities that do not substantially affect the reaction of the coal dust during pyrolyzation when subsequently combined with a binder and/or a polymer derived ceramic (PDC)) is not referred to as "coal dust" herein and is referred to herein as "pyrolyzed coal dust" or "carbon dust." Coal is abundantly available and costs less than $0.02 center per pound and is comparatively easy to crush into a dust and to grade into various sieve sizes.

SUMMARY

A coal core composite roofing material is formed into a roofing tile capable of being installed as any other roofing tiles or slate tiles. The tiles are lighter and more resistant to weathering and damage from sun, rain, hail, fire or freezing temperatures than other roofing materials, without increasing costs of the tiles or installation. The material may be fabricated at very low cost from coal dust. Coal is abundantly available, and the composite tile produced has a comparatively low cost, excellent durability, fire resistance and water shedding characteristics.

Surprisingly, when prepared using a synthetic graphite or carbon dust, tiles crack or have other problems that are not observed when coal dust is used in the production of the tiles. When synthetic graphite or carbon dust is added to a polymer derived ceramic, the pyrolyzed material fails to provide composite articles having the same characteristics, even when processed identically or when processed to account for shrinkage variations. Even more surprisingly, coal dust that is pre-pyrolyzed fails to achieve the same results as coal dust that is not heated above 400 degrees C., prior to mixing with polymer derived ceramic.

For example, coal dust was pre-pyrolyzed to drive off water and organic compounds from the coal dust, leaving a powdered carbon dust or a gravely mixture of carbon, depending on the source of the coal dust. If gravely, the coal dust was milled to a powdery carbon dust before proceeding. The pre-pyrolyzed coal dust, which was pyrolyzed in a substantially non-oxidizing atmosphere, produced a carbon dust that failed to produce particles and composite articles that showed the benefits that un-pyrolyzed coal dust exhibited when added to composite articles.

However, pre-heated coal dust, which was preheated at a temperature less than 400 degrees centigrade, driving off low temperature volatile organic compounds and some water, performed the same or similarly when used in composite particles and articles as the as-received coal dust.

Coal is abundantly available and costs less than $0.02 center per pound and is comparatively easy to crush into a dust and to grade into various sieve sizes. However, due to coal dusts varying compositions, depending on the source and type of the coal, it has not been considered as a source for production of modern composite materials.

Surprisingly, the use of coal dust, which contains a number of volatile and comparatively non-volatile organic compounds and hydrates, when mixed with one or more polymer derived ceramics, produced three dimensional composite articles having superior strength to weight (specific strength), toughness, and stiffness compared to pre-pyrolyzed coal dust and synthetic carbon particles, regardless of the source of coal dust.

In one example, coal dust is functionalized prior to mixing the functionalized coal dust with a pre-ceramic polymer. For example, the coal dust may be coated with a pre-ceramic polymer designed to wet and coat the coal uniformly, first. In one example, an amount of pre-ceramic polymer is selected such that the coal dust may be formed by molding, extrusion or other common ceramic fabrication methods to make a roofing tile or other panel structure.

In one example, a green, formed structural tile is then "pyrolyzed" in an inert gas. Herein the term "pyrolyzed" means a process of heating to high temperatures, greater than 400 degrees C., more preferable at temperatures approaching 1000 degrees C. or greater, in an inert atmosphere, and the term pyrolyzed is distinguished from "firing" in air or an oxygen-containing atmosphere.

For example, the pyrolyzation process forms a hard, strong, fire-resistant/fire proof tile, panel or part. Once the part is removed from a first pyrolysis, there may be significant porosity. In one example, a pyrolyzed part with significant porosity may be infiltrated or coated with an organic resin or resins or with a fire-resistant inorganic resin or resins in the cured form, without pyrolysis, to add additional water resistance to the tile.

In one alternative, a pyrolyzed body of a tile is infiltrated, coated, or both infiltrated and coated with organic resins, resulting in a fire resistant and water proof composite tile, without subsequently pyrolyzing the organic resins. In another alternative, the body is infiltrated, coated, or both infiltrated and coated with pre-ceramic polymer resin or resins and is pyrolyzed, resulting in a fire proof and water proof structure. In yet another alternative, a glass frit or glaze is applied to a surface of a pyrolyzed body, resulting in fire proof and water proof composite tile. In this example, the glass frit or glaze may be fired after application to the surface of the pyrolyzed body, such as a roofing tile.

The coal dust ceramic is rendered fireproof by pyrolyzation, and a substantial portion of the coal is chemically altered. In one example, the pre-ceramic polymers are selected to coat and encapsulate the coal particles within a matrix of the pre-ceramic polymers. The hardness, impact resistance and fire resistance of tiles made of the pyrolyzed coal dust ceramic is the same or better than slat and ceramic tiles, and the weight is substantially less than slate and ceramic tiles.

In one example, the amount of coal dust used in a component ranges from 5 wt % to 95 wt % coal dust to total mass of the mixture of coal dust to pre-ceramic polymer, more preferably 40 wt % to 75 wt %. Other fillers or reinforcements may be added, such as fibers, short fibers or other fillers. For example, coal is pulverized to a powder in the size range from 150 micrometers to submicron size prior to use in the invention. Submicron size refers to less than 1 micron, more preferably from 0.01 microns to 1 micron. Coal dust may be "pre-processed" to remove unwanted contaminants, water, precious metals, ferrous metals, and the like prior to mixing the coal dust with a pre-ceramic polymer or polymers.

BRIEF DESCRIPTION OF THE DRAWINGS

The following drawings are illustrative examples and do not further limit any claims that may eventually issue.

FIG. 1 illustrates a perspective view of a roof tile.

FIG. 2 shows an illustration of a partial cross section showing a microstructure of a green body.

FIG. 3 shows an illustration of a partial cross section showing a microstructure of a pyrolyzed body.

FIG. 4 shows an illustration of a partial cross section showing a microstructure of an infiltrated and coated pyrolyzed body.

FIG. 5 shows an illustration of a partial cross section showing a microstructure of a re-pyrolyzed infiltrated body.

FIG. 6 shows an illustration of a partial cross section showing a glazed and fired pyrolyzed body.

FIG. 7 illustrates a composite tile with a cast structural feature.

When the same reference characters are used, these labels refer to similar parts in the examples illustrated in the drawings.

DETAILED DESCRIPTION

An amount of coal dust is produced by milling coal to a powder. For example, coal is pulverized to a powder in the size range from 150 micrometers to submicron size prior to use in the invention. Submicron size refers to less than 1 micron, more preferably from 0.01 microns to 1 micron. The powdered coal dust may be divided into size ranges, such that the size range is associated with one or more particular size ranges, such as submicron sized powders, 1 to 10 microns, 10 to 50 microns, 50 to 150 microns or the like. For example, a sieving procedure, suspension procedure, centrifuge procedure or the like may be used to select a particular coal dust size range.

The coal dust may be pre-processed, either before or after selecting a particular size range. For example, the pre-processing step may remove unwanted contaminants, water, precious metals, ferrous metals, and the like prior to mixing the coal dust with a pre-ceramic polymer or polymers or may add certain constituents to the coal dust, such as water, metal powders and the like. The coal dust may be preheated at temperatures less than 400 degrees C., more preferably no greater than 200 degrees C.

The coal dust may be mixed with a pre-ceramic polymer in a range from 5 wt % to 95 wt % coal dust to total mass of the mixture of coal dust and pre-ceramic polymer, more preferably 40 wt % to 75 wt %, even more preferably 50 wt % to 75 wt %, yet even more preferably 60% to 75%, or 70% to 75%, such that the coal dust particles are coated with the pre-polymer ceramic, and the mixture is capable of being formed into a shape 10, under pressure, and consolidated into a green body, such as illustrated in FIG. 1.

In one example, other fillers or reinforcements may be added, such as fibers, short fibers or other reinforcement, catalysts and fillers. For example, glass fibers, basalt fibers, carbon fibers, ceramic fibers, nanotubes, nanofibers, metal fibers and combinations of these may be added. Any of the fibers may be processed prior to adding to the mixture, such as chopped, milled, chopped strand mat, glass wool, glass felt, woven cloth, knitted cloth, uniaxial cloth, non-woven cloth, non-woven veils and/or combinations of these. Types of glass may be selected such as E-glass, S-glass, silica glass, quartz class and the like. Other types of glass may be added with or without first functionalizing or modifying the surface of the glass, for example. For example, other powders, particles or beads may be added, such as glass, mineral, metal, ceramic and combinations of these. For example, ceramic powders or nanopowders may be added as a filler or to bind to in situ formed carbon ceramic constituents created during pyrolysis. For example, metal constituents may be added as fibers, filaments, metal sponge, beads, particles or powders. In one example, a metal or metal alloy is selected having a comparatively low melting point, such as bismuth, tin, aluminum, misch metal, zinc and the like, such that the metal at least partially melts during pyrolysis, filling spaces and increasing the rate of sintering of the green body, for example. For example, ceramic fibers or powders may be selected from aluminosilicate, alumina, mullite, silicon carbide, silicon nitride, silicon oxynitride or combinations of these. For example, carbon fibers may be PAN or pitch-based fibers. For example, carbon fibers may be heat treated such that the fibers are pre-ox PAN, pyrolyzed, graphitized or combinations of these. Nanotubes or nanofibers may be comprised of ceramic, carbon, metal or combinations of these.

For example, coal is pulverized to a powder in the size range from 150 micrometers to submicron size prior to use in the invention. Submicron size refers to less than 1 micron, more preferably from 0.01 microns to 1 micron. Coal dust may be "pre-processed" to remove unwanted contaminants, water, precious metals, ferrous metals, and the like prior to mixing the coal dust with a pre-ceramic polymer or polymers. The coal can be pre-heated or pre-oxidized to control the amount of water and other volatiles in the coal either before or after crushing, milling or grinding the coal into a powder.

For example, the grade of coal may be selected from sub-bituminous, bituminous, anthracite or combinations of these. Pre-processing at a temperature of the coal less than 450 degrees C. may be selected to remove excess water, volatile organics, and other contaminants.

Surprisingly, in one example, raw coal dust is utilized after only a de-watering step, saving time, energy and money compared to any previously known process for utilizing coal dust as a filler. The microstructure of such a composite, prior to pyrolysis is schematically represented in FIG. 2, for example. For example, a pre-ceramic polymer 24 is mixed with coal dust 22. In one example, the carbon dust is functionalized. For example, the coal dust may be functionalized by preprocessing the carbon dust with a solvent or carrier that introduces functional groups that modify the surface of the coal dust particles helping the coal dust to mix with and become coated with the pre-ceramic polymer, prior to introducing the pre-ceramic polymer. The functional group or groups may be selected from vinyl, butyl, propyl, propargyl and the like or mixtures of these. Solvents and/or fugitive fluids may be used to aid in mixing and shaping of a tile. For example, a solvent may be used that is volatile and evaporates during heating prior to pyrolysis.

For example, pre-ceramic polymers may form a ceramic upon heating at pyrolytic temperatures and may be optimized to coat and seal coal particles, producing a fire-proof ceramic coating upon pyrolysis. Preferably, pre-ceramic polymers are selected having a high conversion yield (i.e. the mass percentage of the original resin that exists following pyrolysis as stable ceramic) ranging from 70% to 90% by mass.

For example, coal dust may be mixed with pre-ceramic polymers and may be formed into a shape, such as a tile. The shape may be formed by compression molding, extrusion, stamping and the like. Preferably, the green density shape (green body) is compressed under pressure to a density near full density, and the green density parts are cured. For example, curing may hold the green density shape at a temperature from 100 to 220 degrees C. for a curing period. The curing period may be selected to be greater than one hour, for example. In one example, curing is performed in air. Alternatively, curing is performed in an inert atmosphere, reducing oxidation effects during curing and eliminating oxygen diffusion into the green body. Then, the cured green body is pyrolyzed at a temperature from 400 to 1200 degrees C. in an inert atmosphere, such as nitrogen, argon, helium or a combination of these.

In one example, the pre-ceramic polymer is pyrolyzed into a ceramic coating in which coal particles are embedded, preventing oxygen from reaching the coal particles and bonding the coal particles together.

In one example, such as illustrated in FIG. 3, a chemical reaction occurs between the coal particles and the pre-ceramic polymer, such that at least a portion of the coal dust chemically reacts with the pre-ceramic polymer and forms a ceramic matrix 32 with or without voids 36. In this particular example, the overall dimensions of the tile body 10 schematically illustrates bulk shrinkage, as well as the development of pores or voids 36 within the body 10 of the tile. In one example, substantially all of the coal dust reacts to form a carbon-ceramic composite. The rate and extent of the reaction is thought to depend on the size of the coal dust particles and the weight percent of coal dust to coal dust and pre-ceramic polymer mixture. In one example, a pyrolyzed green body is converted to a ceramic tile having a comparatively low density of about 1.5 grams per centimeter cubed (g/cc) and having a porosity in a range from ten percent (10%) to twenty-five percent (25%), for example.

For example, the pyrolyzed green body may be post-processed by infiltrating, coating or both infiltrating and coating the pyrolyzed green body with a pre-ceramic polymer or other polymer or wax. A pre-ceramic polymer for post-processing may be selected to be the same or different from the pre-ceramic polymer originally mixed with the coal dust. Preferably, a pre-ceramic polymer is selected for decreasing the porosity and providing water permeation resistance. For example, a schematic illustration of the reinfiltrated, previously pyrolyzed body is illustrated in FIG. 4. The ceramic body 10 is comprised of a core ceramic 42 and a sealer/filler 41, which may penetrate into the body 10 filling voids, for example.

In one example, the pre-ceramic polymers are selected to be fireproof after pyrolysis, as illustrated schematically in FIG. 5. A ceramic core 52 may have a comparatively greater amount of carbon than a ceramic surface layer 51, for example. Alternatively, a polymer may be selected for infiltration and/or coating of a pyrolyzed green body that will not be pyrolyzed but is fire-resistant after curing at non-pyrolytic temperatures. For example, a polymer may be selected that is fire resistant and improves impact resistance of a tile, while rendering the tile water resistant. For example, thermoplastic polymers, including recycled thermoplastic resins such as PET, PBT, PP, and the like, or modified versions of thermoplastic polymers, thermosetting polymers such as epoxies, phenolics, PVC, CPVC, and other thermosetting polymers, or modifications of thermosetting polymers, create a waterproof tile that is fire resistant, also. Any of these may be used with inorganic fillers or fire retardant additives to render additional fire resistance, for example.

In one example, engineering resins such as PEEK, PEKK, BMI, Polyimide, polyamide-imide, cyanate ester, or the like may be used to infiltrate and/or coat the pyrolyzed green body. Alternatively, a pre-ceramic polymer is re-infiltrated and/or coated on the pyrolyzed body and then re-pyrolyzed one or more times. For example, each pyrolysis may be at a temperature between 400 and 1200° C., more preferably between 800 and 1200 degrees C.

In one example, a tile is coated or glazed and is processed as a normal ceramic roofing tile to produce a decorative roofing tile. This may be accomplished using a pyrolyzed body, an infiltrated, pyrolyzed body, an infiltrated, re-pyrolyzed body or the like. The coating or glaze may be fired in air, for example. A schematic microstructure is illustrated in FIG. 6 with a pyrolyzed microstructure with cracks or voids filled with an infiltrated material, either re-pyrolyzed or otherwise, and a glaze coating a surface of the tile. For example, glazes 61 may be made of modified glasses or glass forming polymers.

The pyrolyzed panel can also be infiltrated/sealed/coated with common organic resins to render the material not only water proof but also "fire-resistant" as that term is defined in applicable standards.

In FIG. 7, a structural feature 14 is added to secure the tile 10 to the roof and is molded into the original green body. Alternatively, such a structural feature may be added by machining or the like, after curing, but before pyrolysis. The cured material may be machined similarly to any hard polymer article. In one example, a structural feature is added after pyrolysis, which requires machining processes similar to other ceramic articles.

Some examples of pre-ceramic polymers include the following: siloxanes and polysiloxanes—including organic substituted siloxanes, silsesquisiloxanes, and other modified siloxanes or modified polysiloxanes, including siloxanes and polysiloxanes modified with metal oxides; polycarbosilanes—including stoichiometric SiC forming polymers and carbon or oxygen containing polycarbosilanes; silanes, polysilanes and modified silanes or modified polysilanes; silazanes, polysilazanes, or modified silazanes or modified polysilazanes; phosphate based ceramic forming polymers; and oxide ceramic forming polymers, including sol-gel precursors.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A method of making a coal core composite roofing material comprises:
   mixing a polymer, the polymer being selected as a polymer derived ceramic precursor, and coal dust, wherein the coal dust is not a synthetic graphite or carbon dust, and prior to mixing the coal dust comprises volatile and comparatively non-volatile organic compounds and hydrates, to form a mixture;
   forming the mixture into a shape of a roofing tile capable of being installed as any other roofing tile or slate tile; and
   pyrolyzing the mixture in an inert atmosphere, wherein the coal dust is not heated above 400 degrees C., prior to step of mixing, wherein a substantial portion of the coal dust chemically reacts with the polymer derived ceramic precursor during the step of pyrolyzing, whereby the coal core composite roofing material has improved mechanical properties and fire retardance.

2. The method of claim 1, wherein the coal dust was preheated at a temperature less than 400 degrees centigrade, prior to the step of mixing.

3. The method of claim 2, wherein the coal dust that was preheated at a temperature less than 400 degrees centigrade, was preheated at a temperature and duration sufficient to drive off low temperature volatile organic compounds and some water.

4. The method of claim 1, wherein the step of pyrolyzing produces a three-dimensional composite article having superior specific strength, toughness, and stiffness compared to the same three-dimensional composite article formed and pyrolyzed using a pre-pyrolyzed coal dust or synthetic carbon particles, instead of the coal dust of claim 1.

5. The method of claim 1, further comprising functionalizing the coal dust prior to mixing the functionalized coal dust with the polymer of claim 1.

6. The method of claim 5, wherein the step of functionalizing coats the coal dust with a pre-ceramic polymer selected to wet and coat the particles of the coal dust, uniformly, prior to the step of mixing.

7. The method of claim 6, further comprising selecting an amount of pre-ceramic polymer such that the coal dust and pre-ceramic polymer is formable by molding or extrusion; and
   molding or extruding the mixture to form a roofing tile or other panel structure by the process of molding or extruding the mixture.

8. The method of claim 1, wherein the step of pyrolyzing is conducted at a temperature greater than 400 degrees centigrade.

9. The method of claim 8, wherein the step of pyrolyzing is conducted at temperatures less than 1000 degrees centigrade.

10. The method of claim 8, wherein the step of pyrolyzing is conducted at temperatures greater than 1000 degrees centigrade.

11. The method of claim 1, wherein fibers, short fibers or fillers are added to the mixture during the step of mixing.

12. The method of claim 1, wherein the coal dust is pulverized to a powder in the size range from 150 micrometers to 0.01 microns.

13. A tile made by the method of claim 1, the tile formed by pyrolyzation comprising: a hard, strong, fire-resistant/fire proof tile, panel or part, wherein the amount of coal dust mixed with the polymer in the step of mixing ranges from 40 wt % to 75 wt % of coal dust to total mass of the mixture.

14. The tile of claim 13, wherein the tile has significant porosity after the step of pyrolyzation.

15. The tile of claim 14, wherein pores of the tile are infiltrated or coated or both infiltrated and coated with an organic resin or with a cured, fire-resistant inorganic resin, without pyrolysis, such that the tile is water resistant.

16. The tile of claim 15, wherein the pores of the tile are infiltrated or coated or both infiltrated and coated with an organic resin.

17. The tile of claim 13, wherein the tile has significant porosity after the step of pyrolyzation, and the tile is infiltrated, coated, or both infiltrated and coated with a pre-ceramic polymer resin and is pyrolyzed again, wherein the tile becomes a fire proof and water proof structure.

18. A tile made by the method of claim 1, the tile formed by pyrolyzation comprising: a hard, strong, fire-resistant/fire proof tile, panel or part, and a glass frit or glaze applied to a surface of the tile after the step of pyrolyzation, and the glass frit or glaze coated tile is fire proof and water proof.

19. The tile of claim 18, wherein the glass frit or glaze is fired in an oxidizing atmosphere.

* * * * *